(12) United States Patent
Balasubramanian et al.

(10) Patent No.: US 12,468,835 B2
(45) Date of Patent: Nov. 11, 2025

(54) SYSTEM AND METHOD FOR SESSION-AWARE DATASTORE FOR THE EDGE

(71) Applicants: AT&T Intellectual Property I, L.P., Atlanta, GA (US); The Governing Council Of The University Of Toronto, Toronto (CA)

(72) Inventors: Bharath Balasubramanian, Princeton, NJ (US); Shankaranarayanan Puzhavakath Narayanan, Hillsborough, NJ (US); Eyal De Lara, Toronto (CA); Seyed Hossein Mortazavi, Toronto (CA); Mohammad Saleheh, Toronto (CA)

(73) Assignees: AT&T Intellectual Property I, L.P., Atlanta, GA (US); The Governing Council Of The University Of Toronto, Toronto (CA)

( * ) Notice: Subject to any disclaimer, the term of this patent is extended or adjusted under 35 U.S.C. 154(b) by 829 days.

(21) Appl. No.: 16/508,009

(22) Filed: Jul. 10, 2019

(65) Prior Publication Data
US 2021/0012025 A1 Jan. 14, 2021

(51) Int. Cl.
*G06F 16/21* (2019.01)
*G06F 16/953* (2019.01)
*G06F 21/62* (2013.01)

(52) U.S. Cl.
CPC ........ *G06F 21/6227* (2013.01); *G06F 16/953* (2019.01)

(58) Field of Classification Search
CPC ............... G06F 21/6227; G06F 16/953; G06F 16/24552; G06F 16/24; G06F 16/282; G06F 3/0482; G06F 16/243; G06F 16/3346; G06F 16/90324; G06F 9/466; H04L 67/1095; H04L 67/306
(Continued)

(56) References Cited

U.S. PATENT DOCUMENTS 4,590,468 A * 5/1986 Stieglitz ................ H04L 12/417
370/450
5,486,876 A * 1/1996 Lew .................... H04N 21/4341
386/E5.067

(Continued)

OTHER PUBLICATIONS

Mortazavi et al.; "SessionStore: A Session-Aware Datastore for the Edge"; IEEE 4th Int'l Conf. on Fog and Edge Computing; May 2020; 14 pages.
(Continued)

*Primary Examiner* — Tony Mahmoudi
*Assistant Examiner* — Linh Black
(74) *Attorney, Agent, or Firm* — Guntin & Gust, PLC; Atanu Das

(57) ABSTRACT

A method includes creating a session token including a session identifier and a current node, capturing a set of queries in a cache from a client device at the current node associated with the session identification, receiving a request from the client for data access at a second node wherein the request includes the session token, transferring a subset of data records from the current node to the second node, wherein the subset of data records is selected based on the session identifier and the set of queries; and granting access to the client to the second node.

20 Claims, 10 Drawing Sheets

(58) Field of Classification Search
USPC ............... 707/622, 778, 786, 797–799, 829, 707/E17.012
See application file for complete search history.

(56) References Cited

U.S. PATENT DOCUMENTS

| | | | | |
|---|---|---|---|---|
| 5,768,561 | A * | 6/1998 | Wise | G06F 3/14 712/15 |
| 6,813,767 | B1 * | 11/2004 | Willke | G06F 13/36 710/305 |
| 7,529,784 | B2 * | 5/2009 | Kavuri | G06F 3/0649 |
| 8,291,228 | B2 * | 10/2012 | Laidlaw | H04L 63/08 713/176 |
| 8,613,070 | B1 * | 12/2013 | Borzycki | H04L 67/104 726/8 |
| 8,856,869 | B1 * | 10/2014 | Brinskelle | H04L 63/0823 726/2 |
| 9,088,564 | B1 * | 7/2015 | Hobson | H04L 63/0807 |
| 9,135,412 | B1 * | 9/2015 | Talvensaari | H04L 41/0816 |
| 9,455,876 | B1 * | 9/2016 | Grebenschikov | H04L 41/20 |
| 10,917,471 | B1 * | 2/2021 | Karumbunathan | G06F 3/064 |
| 10,983,830 | B2 * | 4/2021 | Theimer | G06F 9/5027 |
| 11,080,336 | B2 * | 8/2021 | Van Dusen | G06Q 50/184 |
| 11,089,105 | B1 * | 8/2021 | Karumbunathan | G06F 16/275 |
| 11,171,950 | B1 * | 11/2021 | Zhuravlev | H04L 67/141 |
| 11,204,938 | B2 * | 12/2021 | Kleinpeter | G06F 11/1469 |
| 2006/0026286 | A1 * | 2/2006 | Lei | H04L 67/142 709/227 |
| 2007/0124806 | A1 * | 5/2007 | Shulman | H04L 63/08 726/5 |
| 2007/0299804 | A1 * | 12/2007 | Liu | G06F 16/2471 |
| 2010/0067705 | A1 * | 3/2010 | Boccon-Gibod | G06Q 20/1235 380/285 |
| 2010/0070448 | A1 * | 3/2010 | Omoigui | H01L 27/1463 706/55 |
| 2012/0005283 | A1 * | 1/2012 | Provo | H04L 12/4641 709/248 |
| 2013/0276080 | A1 * | 10/2013 | Nakonetzki | H04L 63/08 726/7 |
| 2014/0075004 | A1 * | 3/2014 | Van Dusen | G07C 13/00 709/223 |
| 2014/0115329 | A1 * | 4/2014 | Sturonas | H04L 9/0822 713/165 |
| 2014/0304409 | A1 * | 10/2014 | Kamath | H04L 67/1036 709/225 |
| 2015/0135206 | A1 * | 5/2015 | Reisman | H04H 20/93 725/18 |
| 2015/0149916 | A1 * | 5/2015 | Mendez | G06F 16/954 715/738 |
| 2015/0280959 | A1 * | 10/2015 | Vincent | G06F 16/1774 709/203 |
| 2015/0288679 | A1 * | 10/2015 | Ben-Nun | H04L 67/141 726/10 |
| 2017/0075693 | A1 * | 3/2017 | Bishop | G06F 9/5088 |
| 2017/0083386 | A1 * | 3/2017 | Wing | G06F 1/30 |
| 2017/0250812 | A1 * | 8/2017 | Schefenacker | H04L 9/14 |
| 2017/0324988 | A1 * | 11/2017 | Fan | H04L 65/1094 |
| 2018/0081905 | A1 * | 3/2018 | Kamath | G06F 16/287 |
| 2018/0083944 | A1 * | 3/2018 | Vats | H04L 63/0815 |
| 2018/0204111 | A1 * | 7/2018 | Zadeh | G06V 10/764 |
| 2018/0239959 | A1 * | 8/2018 | Bui | G06F 16/93 |
| 2018/0260125 | A1 * | 9/2018 | Botes | G06F 11/2094 |
| 2018/0309837 | A1 * | 10/2018 | Carpenter | H04L 67/02 |
| 2018/0314809 | A1 * | 11/2018 | Mintz | H04L 9/3297 |
| 2018/0324173 | A1 * | 11/2018 | Ananthapur Bache | H04L 63/0815 |
| 2019/0109709 | A1 * | 4/2019 | Wu | G06Q 20/401 |
| 2019/0205424 | A1 * | 7/2019 | Jubb, IV | G06F 16/182 |
| 2019/0205457 | A1 * | 7/2019 | Koorapati | G06F 16/2322 |
| 2019/0208012 | A1 * | 7/2019 | Ying | G06F 16/128 |
| 2019/0208014 | A1 * | 7/2019 | Goldberg | G06F 16/125 |
| 2019/0362009 | A1 * | 11/2019 | Miseldine | G06F 16/285 |
| 2020/0007530 | A1 * | 1/2020 | Mohamad Abdul | H04W 12/084 |
| 2020/0106778 | A1 * | 4/2020 | Park | H04L 63/108 |
| 2021/0234866 | A1 * | 7/2021 | Michalowitz | H04N 21/25883 |
| 2021/0263779 | A1 * | 8/2021 | Haghighat | G06F 9/5061 |

OTHER PUBLICATIONS

Mortazavi et al.; "Toward Session Consistency for the Edge"; USENIX Workshop; 2018; 6 pages.

* cited by examiner

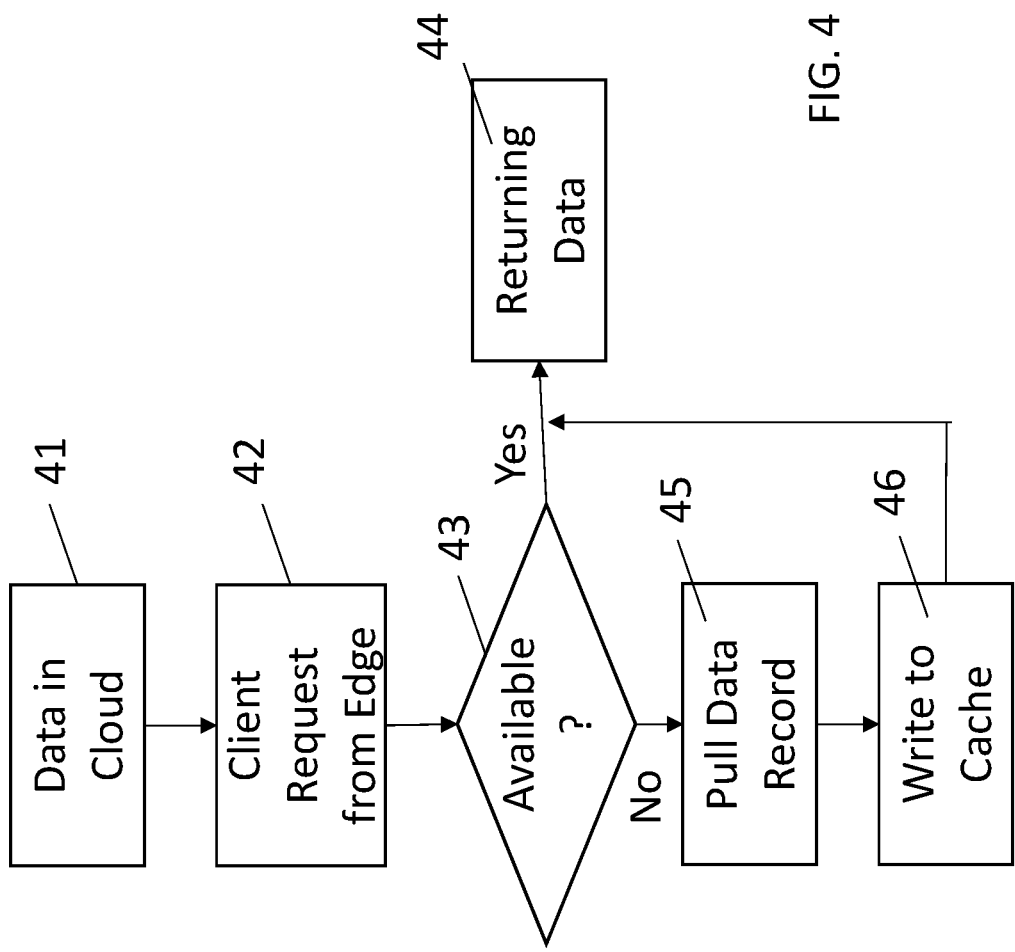

SYSTEM AND METHOD FOR SESSION-AWARE DATASTORE FOR THE EDGE

TECHNICAL FIELD

This disclosure is directed to a system and method for edge computing in a network, and, more specifically, to utilizing session-based techniques to manage data storage nodes at the network edge.

BACKGROUND

Edge computing, is a distributed computing system in which processing and data storage is provided closer to the location where the processing and data storage is used or needed. As such, the computation may be performed on distributed device nodes. Edge computing pushes to the user. Edge computing is useful, for example, in many internet of things applications.

Recent storage systems for the edge generally rely on eventual consistent models to replicate data. Such storage systems propagate updates in the background with the theory that if no new updates are made to an object, eventually all replicas will converge to the same value. Eventual consistency works well for many edge applications where client devices interact with the same replica for the duration of their sessions. In practice, provided the client interacts with the same replica, the storage system in effect provides session consistency Session consistency may be broken when consecutive client requests are sent to different replicas. This may occur in edge applications when: (i) a mobile client switches between edges (ii) functionality is dynamically reallocated between edges; or (iii) an application's functionality has been partitioned between different datacenters (e.g., running some functions on the edge and others on the cloud. Accordingly, there is a need for a system and method to provide a more consistent session when operating in an edge environment.

SUMMARY

The present disclosure is directed to a method including creating a session token including a session identifier and a current node, capturing a set of queries in a cache from a client device at the current node associated with the session identifier; receiving a request from the client for data access at a second node wherein the request includes the session token, transferring a subset of data records from the current node to the second node, wherein the subset of data records is selected based on the session identifier and the set of queries, and granting access to the client to the second node. In an aspect, the current node executes the queries in the cache to create updated data records prior to the transferring step. The subset of data records may include the updated data records. The method may further include sending the cache from the first node to the second node. In an aspect the second node may initiate the transferring step when accessed by the client. The second node may identify the current node based on the session token received from the client. The transferring step may be delayed if there is another transfer in process. In an aspect, the session token includes a status indicator comprising the status of the another transfer and the transferring step is executed when the status indicator identifies the another transfer as completed. In an aspect, the current node and the second node may be hierarchal siblings sharing a common parent node and wherein data records from the current node that have been propagated to the parent node are pulled by the second node from the parent node. In that case, only the data records that have not been propagated to the parent node are transferred from the current node to the second node.

The disclosure is further directed to a system including a client device configured to execute an application thereon and further configured to access one or more edge memory nodes, an input-output interface, a processor coupled to the input-output interface wherein the processor is further coupled to a plurality of memory nodes forming a hierarchal arrangement, the hierarchal arrangement including a parent node and two or more sibling nodes, wherein a subset of the memory nodes comprise the edge memory nodes; each of the memory nodes having stored thereon executable instructions that when executed by the processor cause the processor to effectuate operations including receiving a query at a current edge node from the client device wherein the query includes a session token, processing the query by the current edge node, returning the processed query to the client device, capturing the query in a cache at the current edge node, receiving a transfer request at the current edge node from a destination edge node, executing the query at the current node to create an updated data set, and transferring the cache and the updated data set to the destination edge node. The query is a write request comprising a new data object from the client device and wherein the operations further comprise pushing a new data object from to the parent node from the current edge node. The current edge node may process a plurality of queries by the client device and wherein the transferring step is effectuated by transferring only the updated data set to the destination edge node that does not include the new data object. The transferring step is delayed if the session token includes a status indicating that a transfer is in process.

The disclosure is also directed to a method including receiving a query at a destination node from a client device wherein the query includes a session token having a session identifier, reading the session token to determine a current node associated the session identifier, requesting a transfer of updated data records forming a subset of all data records from the current node, receiving at the destination node the updated data records from the current node and a cache of previous queries executed by the current node, and processing the query. If the current node is a sibling node of the destination node, then the updated data records may exclude data records pulled from the parent node by the destination node. The method may further include receiving a request from a second destination node to transfer further updated records to the second destination node. The request may include that the session token further includes a status field and the transfer of further updated records to the second destination node occurs only after the status field indicates that transfer to the destination node is complete.

BRIEF DESCRIPTION OF THE DRAWINGS

Aspects of the herein systems and methods are more fully described with reference to the accompanying drawings, which provide examples. In the following description, for purposes of explanation, numerous specific details are set forth in order to provide an understanding of the variations in implementing the disclosed technology. However, the instant disclosure may take many different forms and should

FIG. 4 is an exemplary flow chart for queries to an edge node.

DETAILED DESCRIPTION

Figure 1:
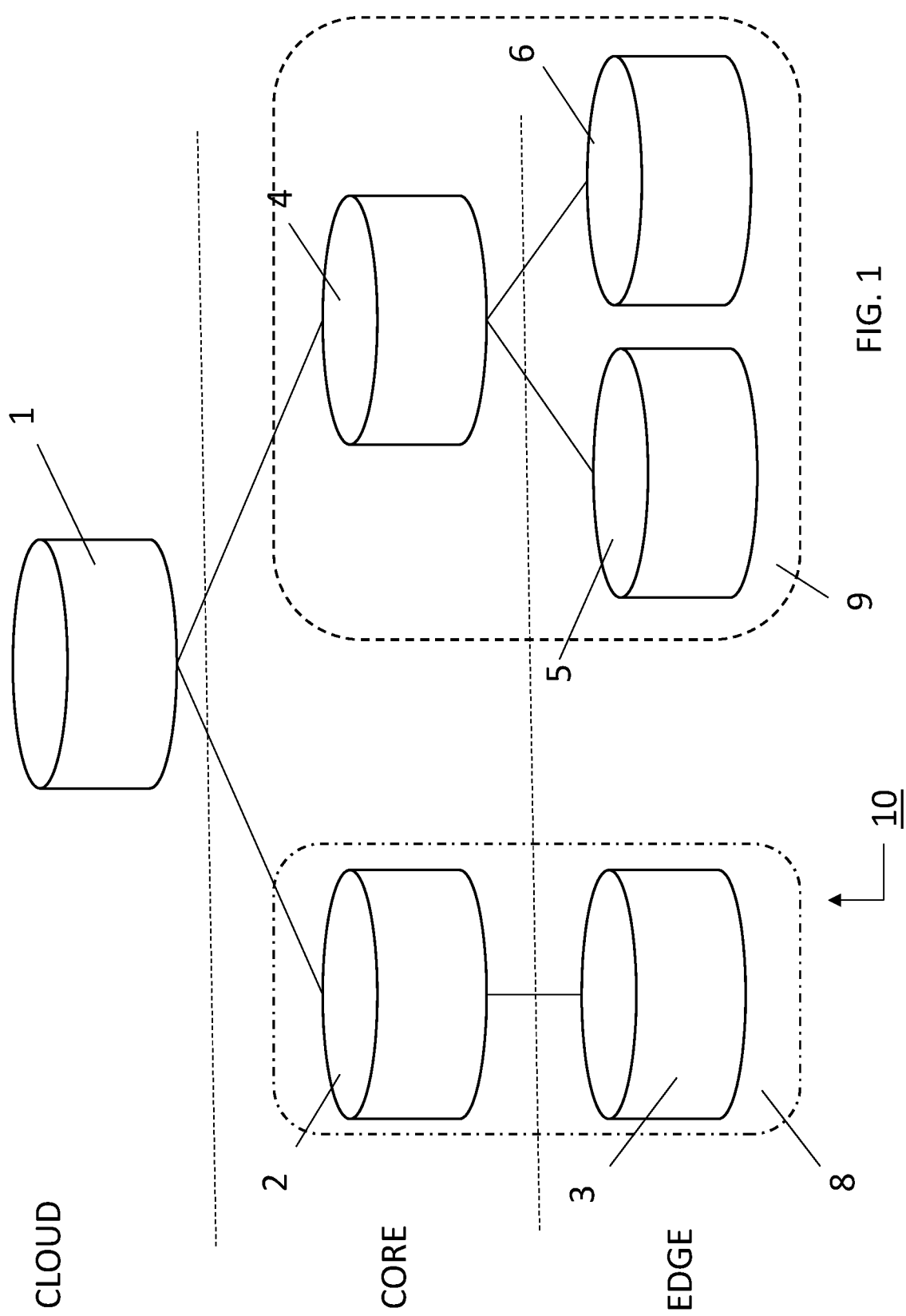
FIG. 1 is a block diagram of an exemplary storage object architecture in accordance with the present disclosure.

System Overview. Network systems, including cellular communication systems, that take advantage of edge computing techniques have pushed functionality typically located in the core network to the network edge. There are some eventual consistency models that improve data storage performance. The first is "read-your-writes' in which subsequent reads by a client that has updated an object will return the updated value or a newer one. The second is "monotonic reads" where if a client has seen a particular value for an object, subsequent reads will return the same value or a newer one.

Building on the foregoing, session consistency presents each individual client with storage objects that are consistent with the client's own actions. Session consistency improves the read-your-writes and monotonic reads eventual consistency models. The system of the present disclosure manages the storage objects accessed by the edge computing devices to create a session-based datastore system and method to enforce consistency in the objects being accessed by one or more clients. This is especially useful when a client device interacts with multiple replicas housed on different datacenters over time, either as a result of application partitioning, or due to client or code mobility.

In an aspect, session storage is a datastore system and method for edge computing that ensures session consistency on top of otherwise eventual consistent replicas. Session storage enforces session consistency by grouping related data accesses into a session and using a session-aware reconciliation algorithm that only reconciles data that is relevant to the session when switching between replicas. This approach may reduce data transfer and latency significantly and may, in fact, reduce such measurements by up to 90% compared to full replica reconciliation. Session storage may employ a query-based tagging mechanism wherein a simple SQL-like query may identify a subset of keys accessed by the client, as opposed to individually tagging all key-accesses. This may save considerable space in tracking this metadata.

In an aspect, a distributed datastore is provided which is tailored for edge computing that provides session consistency between a hierarchy of otherwise eventual consistent replicas. Session consistency may be implemented using full replica reconciliation. In this approach, when a client switches from a source to a destination replica, the destination replica will contain the union of all records available at both replicas before the switch occurs. This approach may result in higher switching times and high bandwidth consumption for the transfer.

In an aspect, when only a fraction of the replica is relevant to a given client, the system and method of the present disclosure supports session consistency using a session aware reconciliation algorithm that only reconciles keys that a client either reads or writes at the source replica. For the purposes of this disclosure, replica, datacenter and node will be used interchangeably and refer to a data storage location.

Operating Environment. FIG. 1 shows an exemplary edge network storage system 10 consisting of a cloud-based datacenter 1 and two mobile networks, 8, 9. Mobile network 8 is shown with a datacenter 2 in the located in the network 8 core and datacenter 3 located on the network 8 edge. Mobile network 9 is shown with a datacenter 4 in the network 9 core and datacenters 5, 6 located on the network 9 edge. When two datacenters such as datacenters 5,6 share a common datacenter, such as datacenter 4, in a hierarchal architecture, datacenters 5, 6 will be referred to as siblings and the datacenter 4 referred to as the parent. It will be understood that this architecture is exemplary only and other architectures may be used in accordance with the system and method of the present disclosure.

In an aspect, each of the datacenters 1, 2, 3, 4, 5, 6 may have a replica of the datastore, with the cloud datastore 1 having a persistent full replica of the datastores. The datastore may provide an API based on CQL, Cassandra's SQL dialect, which organizes data into tables, and provides atomic read and write operations at row granularity. CQL permits users read and write table rows using SQL operations such as SELECT, INSERT, UPDATE, and DELETE, limited to a single table. While other database query languages may be used consistent with the scope and intent of this disclosure, CQL will be used as an example.

To provide lower latency, read and write operations may be performed against the local replica node. On a read request, if the data is not already available on the local replica node, it is fetched recursively from the next level node. The query may then be added in a cache that maintains a record of recently executed CQL queries. Subsequent CQL queries that match an existing entry on the cache, are directly executed on the local replica node. Queries in the cache may be periodically executed in the background to synchronize the local nodes' contents with that of its parent to synchronize the local node's content with that of its parent by fetching new and updated records from the parent node using a pull daemon.

The datastore may support concurrent reads and writes on all replicas of the hierarchy wherein updates are propagated through the replica hierarchy as a background task using a push daemon. Modifications may be tagged with a version timestamp that records the time the row was inserted and the identification of the replica where the modification was initially recorded. In cases where there may have been multiple updates to a row, the modified row with the most recent time-stamp is used.

Figure 2A:
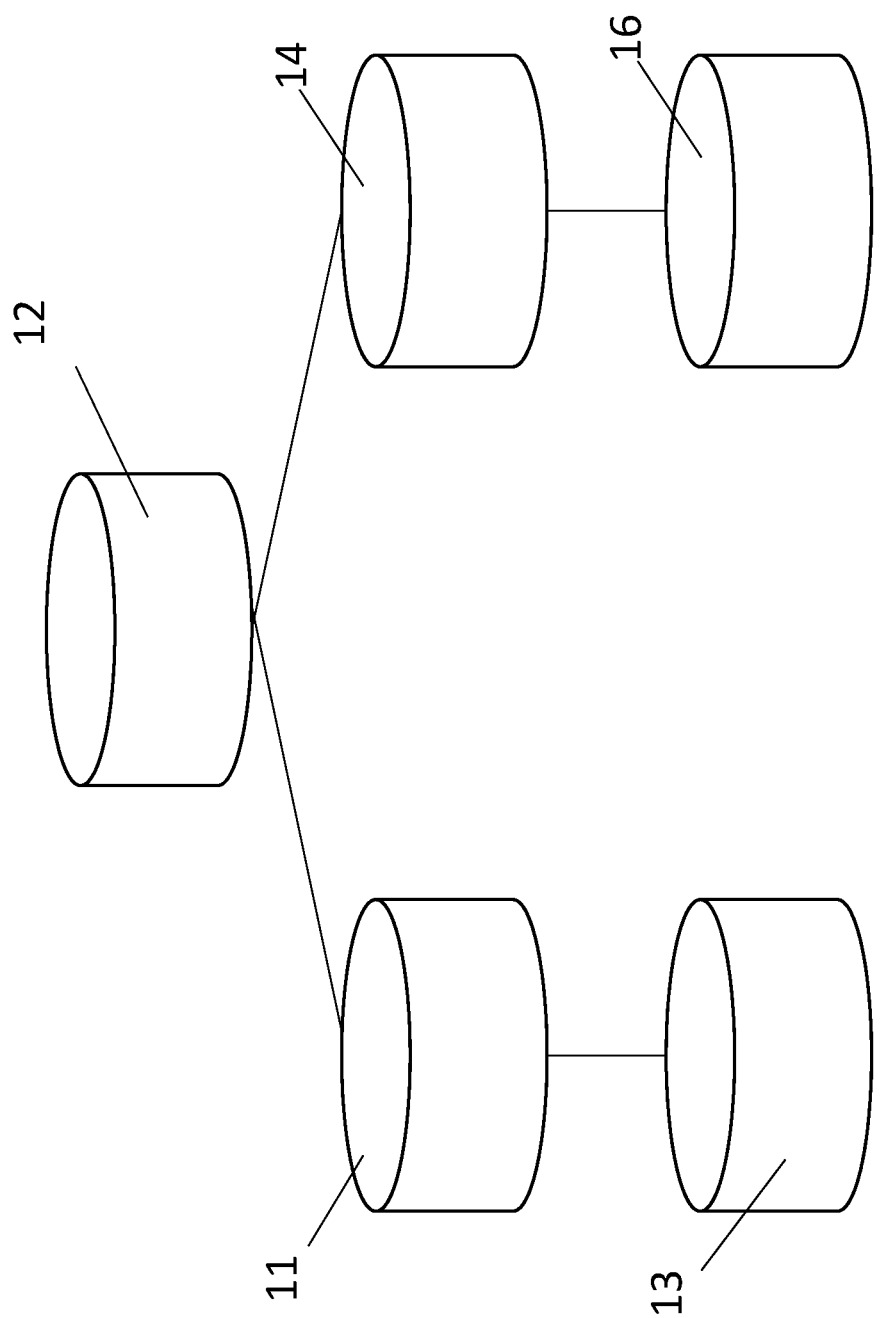
FIG. 2a is a block diagram of an exemplary storage object architecture before any data queries.

FIG. 2a to FIG. 2d illustrates an exemplary query and data flow in accordance with the present disclosure that provides eventual-consistent datastores at hierarchically configured datacenters. FIG. 2a shows an exemplary hierarchal datastore system. There is shown a storage node 12 which may, for example, be cloud based storage. Initially, node 12 may contain all data associated with a particular application. For example, node 12 may contain a simple table having data for two balloons, one small red balloon and one large yellow balloon, with all other nodes 11, 13, 14, 16 being empty.

Figure 2B:
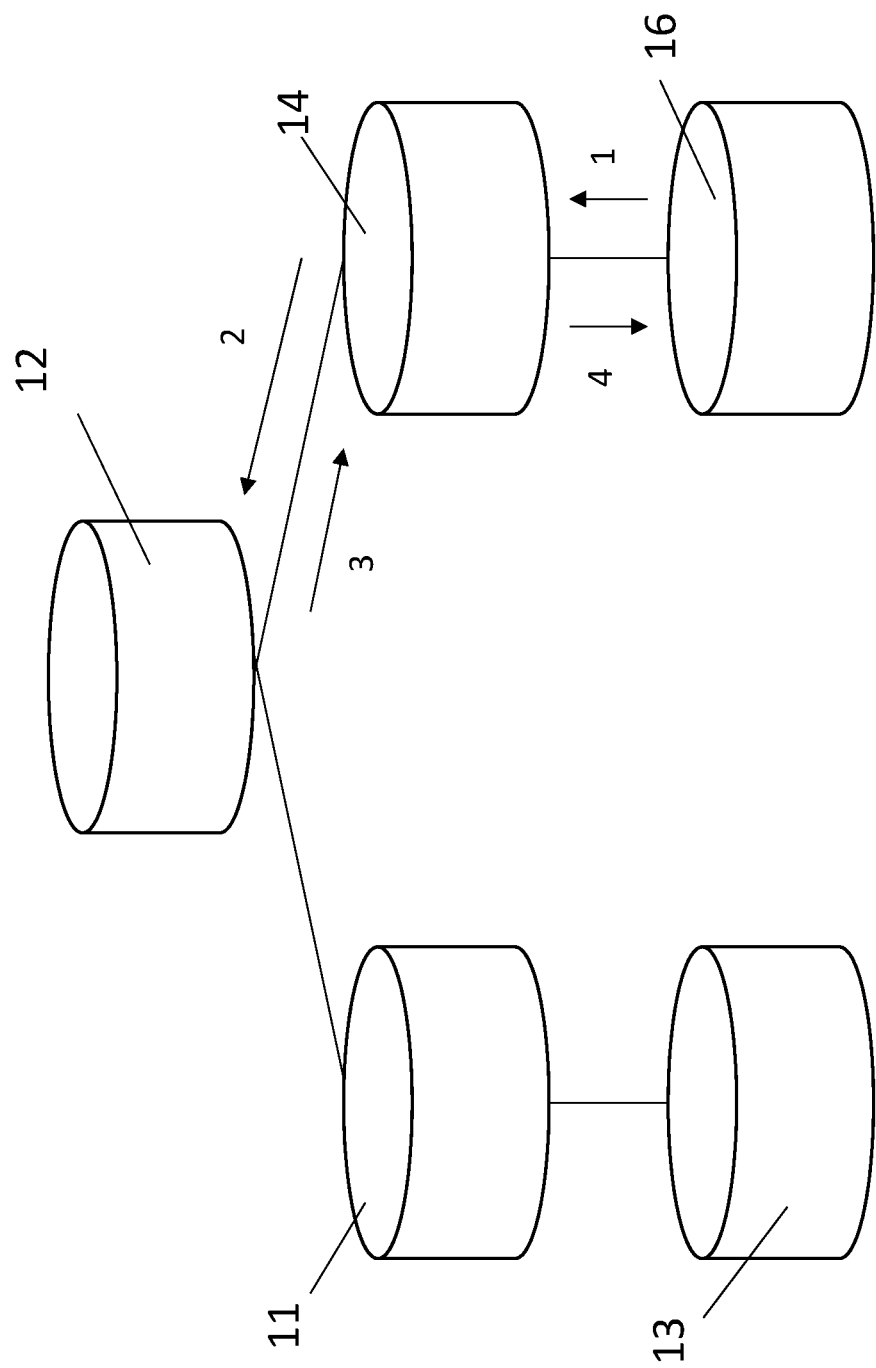
FIG. 2b is a block diagram of an exemplary storage object architecture showing an initial data query.

Turning to FIG. 2b, if a client queries edge node 16 for "balloons size=small," the query would be passed from edge node 16 to core node 14 (arrow 1) then from core node 14 to cloud node 12 (arrow 2) and the query "balloons size=small" is added to edge node's 16 query cache and core node's 13 query cache. The entry for the small red balloon would then be copied from cloud node 12 to core node 14 (arrow 3) and then to edge node 16 (arrow 4).

Figure 2C:
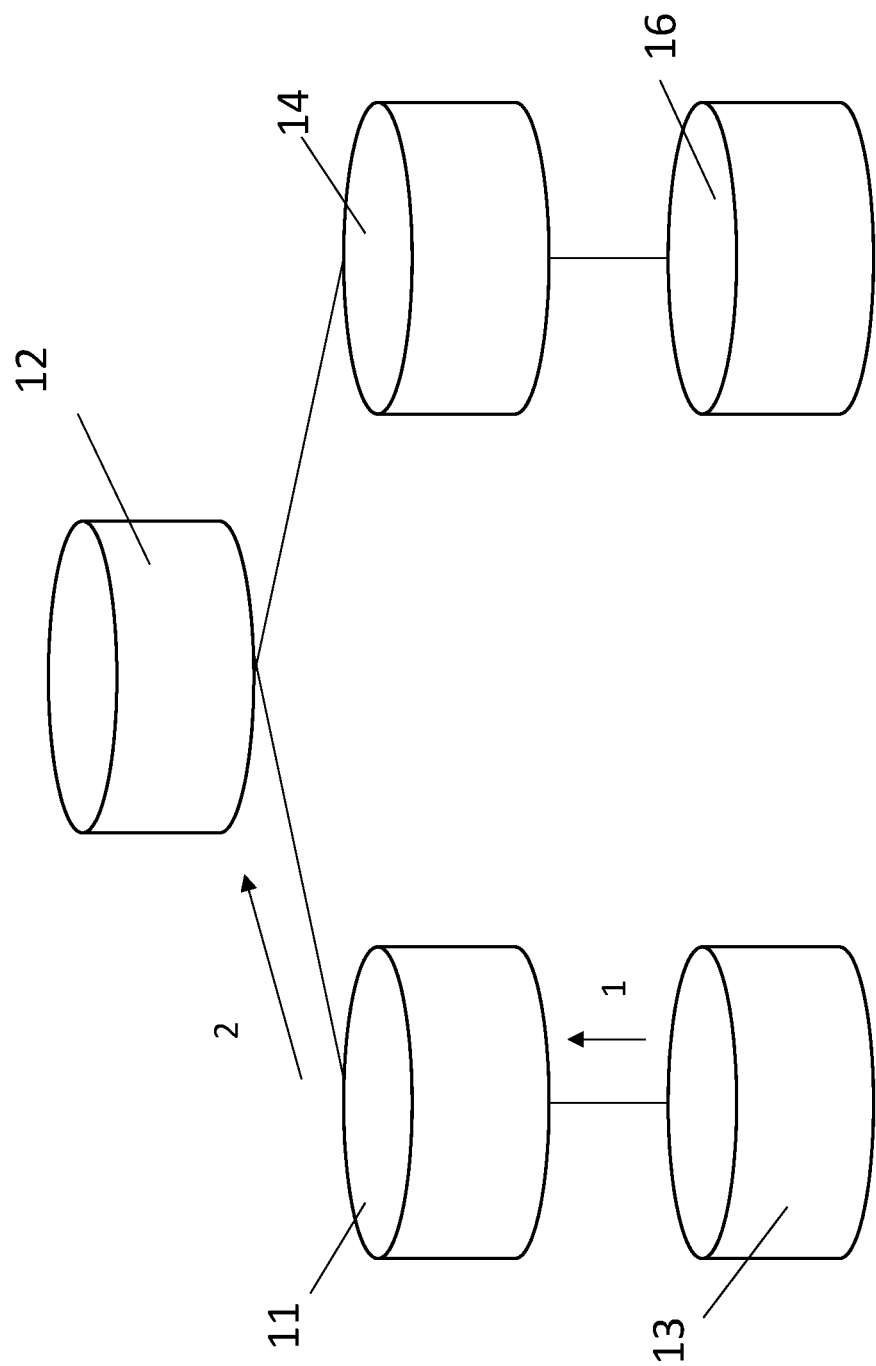
FIG. 2c is a block diagram of an exemplary storage object architecture showing a data write operation.

FIG. 2c illustrates what happens if a client running on edge node 13 adds new data rows for two balloons, one large green balloon and one small blue balloon. A push daemon on edge node 13 propagates the new data onto core node 11 (arrow 1) and the push daemon of core node 11 pushes the new data entries to cloud node 12. At this point, cloud node 12 has 4 data records of the four balloons.

Figure 2D:
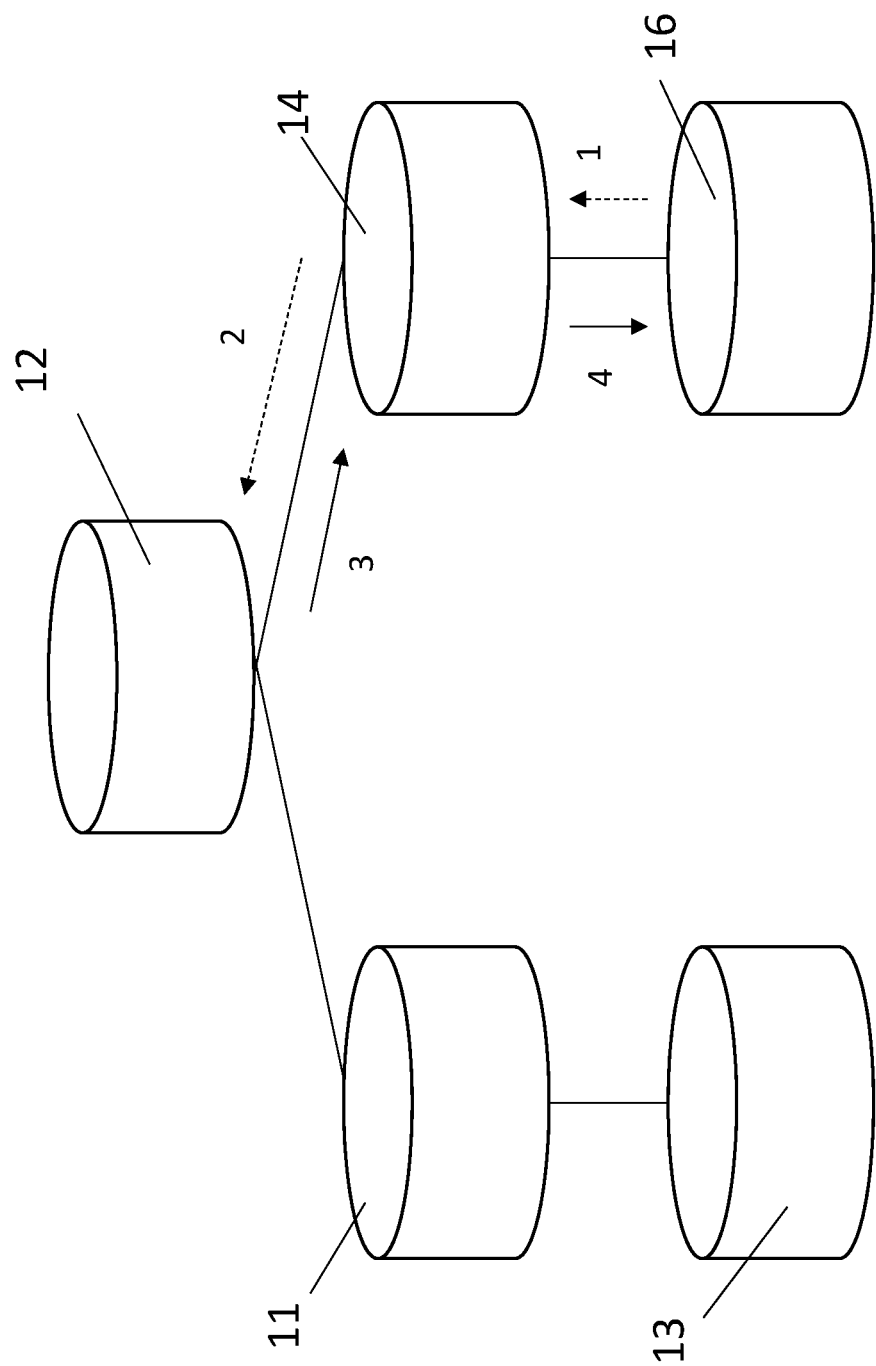
FIG. 2d is a block diagram of an exemplary storage object architecture showing previously queried data being pushed to an edge node.

Turning to FIG. 2d, there is a pull daemon on core node 14 that identifies that there is a new balloon on the cloud node 12 that matches the query in its query cache (dashed arrow 2) and pulls the small blue balloon data record to core node 14 (arrow 3). Similarly, edge node 16 also detects a new data entry that matches an entry in its query cache and the pull daemon pulls the new small blue balloon data entry to edge node 16.

At this point, cloud node 12 has 4 data records for the large yellow balloon, the small red balloon, the green large balloon, and the blue small balloon. The core node 11 and the edge node 13 each have two data records, the blue small balloon and the green large balloon. Finally, the core node 14 and edge node 16 each have two data records, the blue small balloon and the red small balloon.

Figure 5:
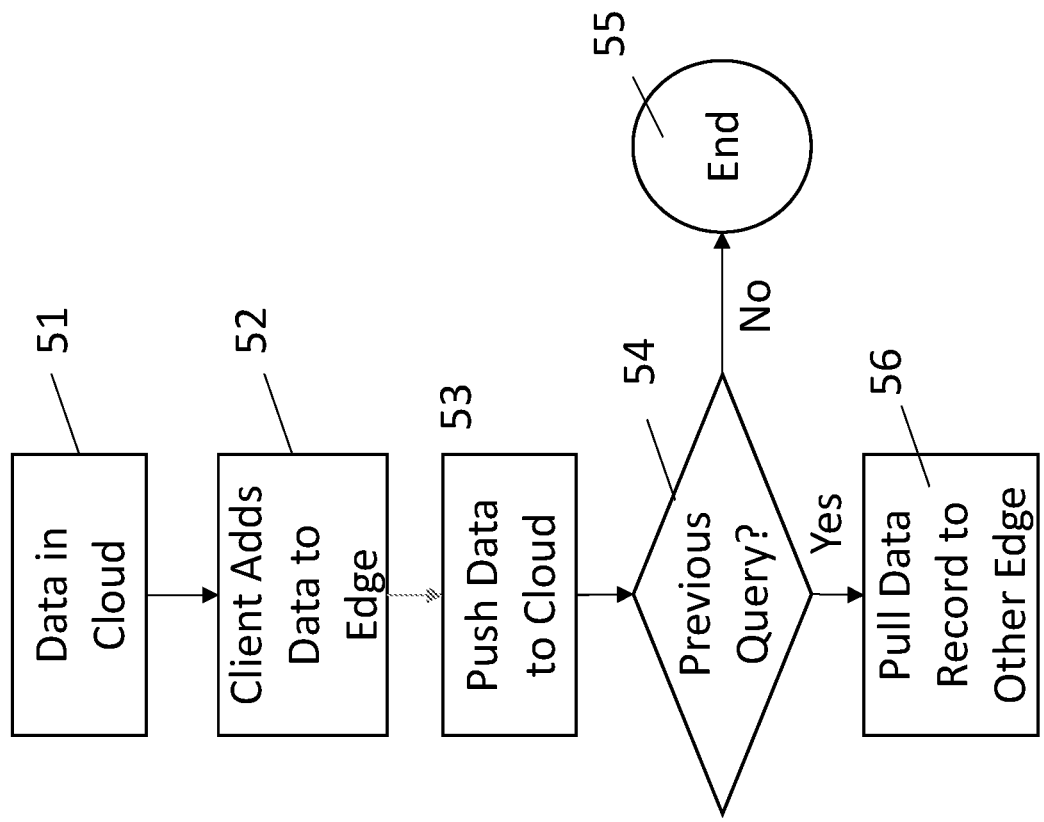
FIG. 5 is an exemplary flow chart for write operations to an edge node.

These exemplary processes are shown in FIG. 4 and FIG. 5. With respect to FIG. 4, there is shown an exemplary process beginning with data being stored in a cloud node at 41. At 42, a client requests data from an edge node by issuing a query. At 43, the edge node determines if the data is available locally. If the data is available locally, the query is fulfilled at 44 by returning data to the requesting client at 44. If the data is not available locally, the data record is pulled to the edge node at 45. The query is then captured in a query cache at 46 and the requested data returned to the client at 44.

FIG. 5 shows an exemplary process in which a client writes new data to an edge node. The process starts with data stored in a cloud node at 51. At 52, the client adds new data records to an edge node. At 53, the new data is pushed to the cloud node. At 54, it is determined whether any of the new data was the subject of a previous query. If yes, the new data record is pulled to the other edge node that issued the query at 56. If the new data record was not the subject of a previous query, the process ends at 55.

Figure 3A:
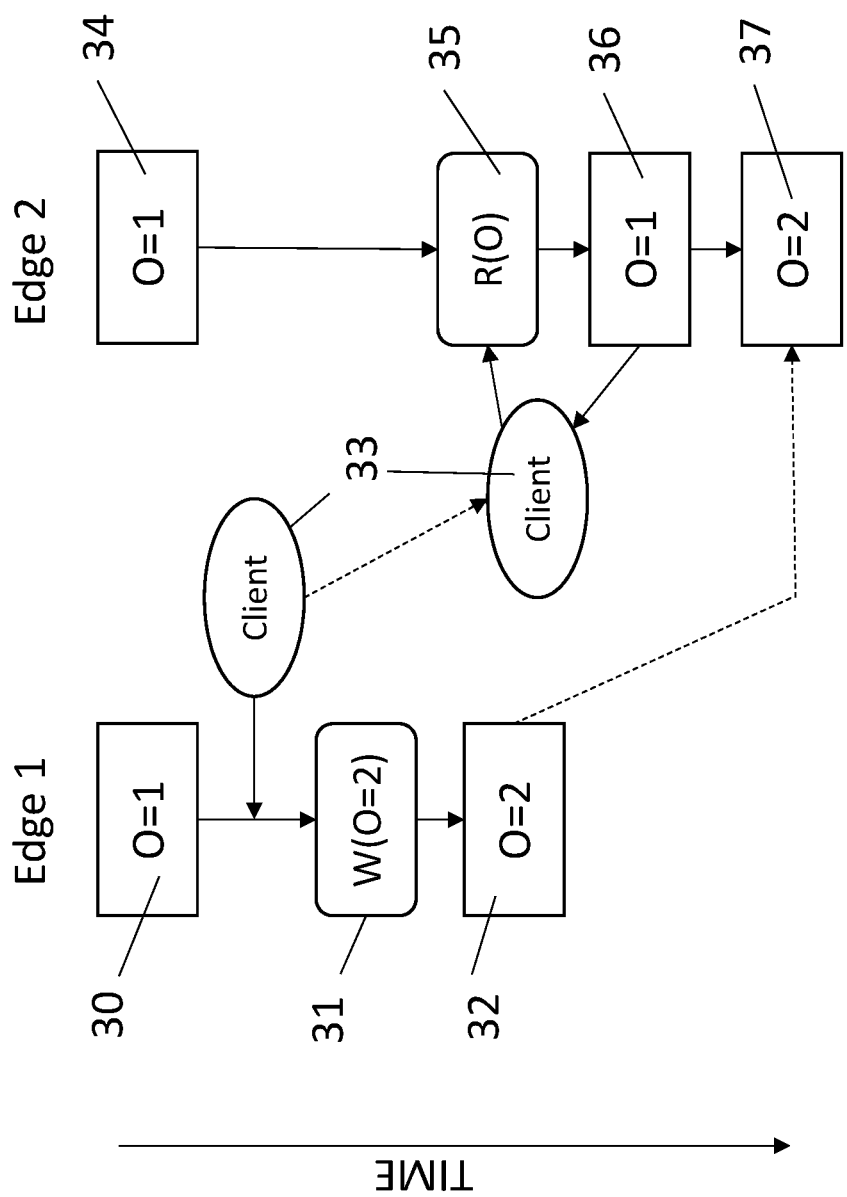
FIG. 3a shows an example of eventual consistency that fails because of timing of subsequent operations on different edge nodes.
Figure 3B:
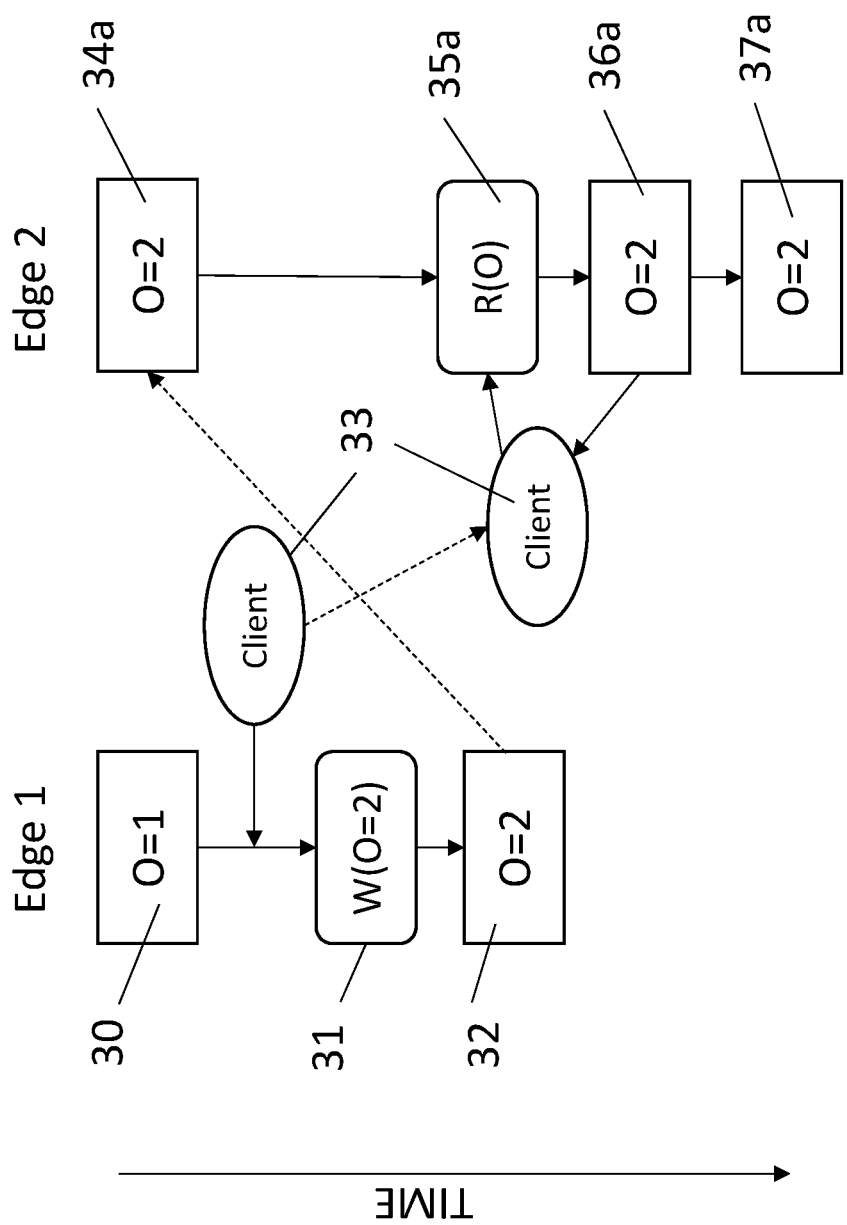
FIG. 3b shows the example of FIG. 3a when the session consistency methods are used.

FIG. 3a and FIG. 3b show the results when the edge node is not updated and when the edge node is updated with such new data, respectively. FIG. 3a shows the Edge 1 node having an original data object=1 at 30. Client 33 then writes data at 31 to create data object=2 at 32. Later in time, the client 33 reads data at 35 from the Edge 2 node, but that data still comprises the original data object=1 from 34. The query returns data object=1 at 36 to the client 33. Eventually consistency will update the Edge 2 node with data object 2 at 37 but may be too late for the application running on client 33.

Conversely, FIG. 3b shows the shows the Edge 1 node having an original data object=1 at 30. Client 33 then writes data at 31 to create data object=2 at 32. Later in time, the client 33 reads data at 35 from the Edge 2 node, but this time, the session data comprising data object=2 has been transferred to Edge 2 node resulting in Edge 2 node data object=2 at 34a. The subsequent query at 35a returns data object=2 at 36a to the client 33. The process of the session transfer is described below.

The eventual-consistent implementation described above can be expanded for session consistency across the storage nodes. Sessions may be defined by the application developer and may, for example, include a user session, a device session, a set of commands issued by a function, or other session definitions that would be useful for the various edge datastores to be consistent throughout. Each session may be assigned a session token which may, for example, have four fields. The fields may be encrypted and include unique session identifier (SID), timestamp, current replica, and status or other categories. The session token may be generated by a server and passed from server to the client, such passing function may, for example, be in the form of an HTTP cookie. Including the session token in accordance with this disclosure transitions the eventual-consistent implementation to a session-consistent implementation.

Tracking by session token may be performed by a command cache added to each node that stores the CQL SELECT statements executed by the session. The entries in the command cache create a one-to-one mapping between the query results and the tuples in the database. The modified rows affected by INSERT, UPDATE and DELETE commands may be tracked using SELECT queries. For example, if the session executes a command where a1 is the primary key (key):

INSERT INTO dbname.t1(key,v1) values (a1, b1), the following query may be stored in the command cache:

SELECT*FROM dbname.t1 WHERE key=a1.

This transformation creates a query that tracks the accessed key a1. The size of the command cache may be managed by deleting queries that are subsumed by broader, more general queries. For example, a query for all red balloons may be subsumed by a subsequent query for all balloons. Moreover, queries may be kept only for data that is actually represented on each node and some historical queries may be deleted based on age. The smaller command cache may be useful in bandwidth, latency and other performance measurements.

To support session consistency, queries for a session token may be run on one node at a time. The location of this node is tracked by the session token itself, namely the current replica field, and every other site keeps track of the various sessions it is serving. When the switching process for a session is initiated by a client request received with a session token, the status field on the session token changes to "Switching to ID" wherein ID is the identification of the destination replica. A separate thread then fetches the session data to the destination replica. During the switching process, if the client requests are processed on another edge replica, the other edge replica will read the status field in the session token and wait for the switching process to the destination replica to finish and then fetch the data from that destination replica. To assure consistency, the source replica will not process further commands for that session. Furthermore, requests for the session are delayed on the destination replica until the switch is complete. When the switching process is finished, it is reflected in the status field.

Figure 6:
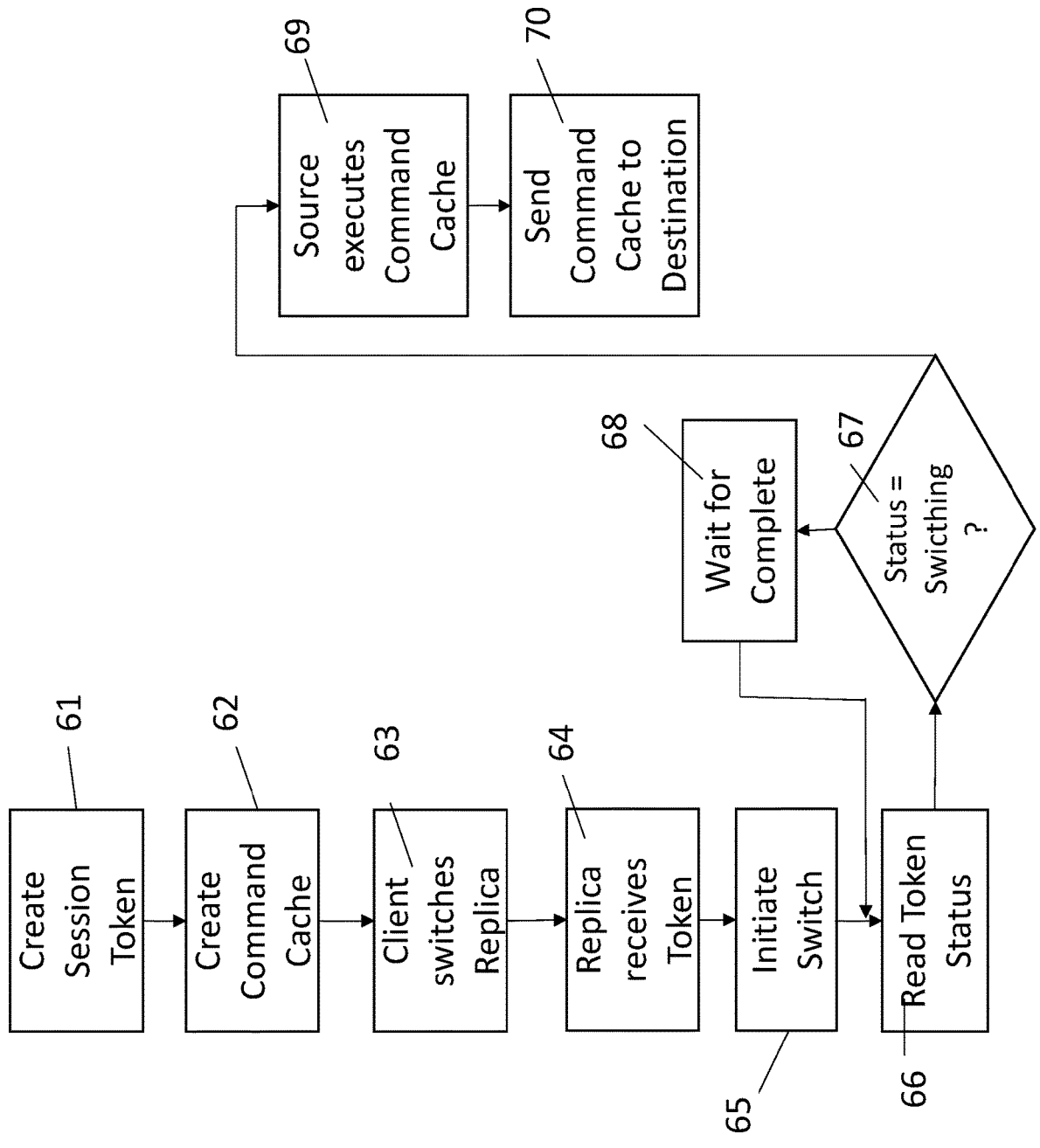
FIG. 6. is an exemplary flow chart showing the session-aware transfer from a source node to a destination node.

With reference to FIG. 6, there is shown an exemplary process for switching a session between nodes. At 61, the session token is created at the source node. At 62, the source node creates a command cache comprising each executed query on that source node. At 63, the client switches replicas by accessing the newer destination newer. The destination node may determine the last location of the session's data by examining the current node field on the session token received at 64. Using this information along with the SID, the destination node can initiate the node switching process 65. The destination reads the status field in the session token at 66 and will proceed unless status indicates the session is transitioning to another replica, in which case the process is delayed at 67 and 68. This switching process initiated by the client may result in the status field transitioning to "switching to destination node," thereby triggering the wait for completion. When the previous session transfer is complete, the status field will reflect "switch to destination node complete." At 69, the source replica will execute all the queries stored in the command cache, then send the command cache and the updated data rows to the destination node at 70. At this point, the transition to the destination node is complete.

If client requests are processed on a different node during the switching process, that request is delayed until the current session transfer is completed. In an aspect, replication may be performed on entire rows, regardless of how many columns have changed. The session token may be used to detect when a client switches between replicas (e.g. when it moves between edge replicas). The destination replica may determine the last location of the session's data by examining the current replica field on the session token received. Using this information and by identifying the session through the SID, the destination replica can initiate the replica switching process.

The above-described process may be optimized in several ways. The delta-list optimization does not copy data that is already present in the destination node. During a session switch, the destination node may select all primary keys and the latest version of data belonging to an application and send that information to the source node. With that information, the source node may then calculate rows access by a session that are not already on the destination node or those rows that have a newer version.

A second optimization technique may be utilized if the source node and destination node are siblings. To take advantage of the fact that data written on the source node is propagated to the parent node by the push daemon of the source node as previously described and because the link from the destination node to the parent node is likely geographically closer and has more bandwidth in the network than the link from the source node to the destination node, this sibling optimization technique may be able to minimize the data transfer between the source node and the destination node. Whenever a row is modified or created on the source node, the push daemon running on the source node will push data to the parent node. The destination node can then fetch new and updated records from the parent node np. During a switch, only the rows that have not yet been pushed from the source node to the parent node need to be replicated from the source node to the destination node. Existing rows on the destination node that also exist on the source node that have been accessed during a session are confirmed as updated by using the command cache and then comparing each query in the command cache with the queries in the query cache of the destination node. If the query cache in the destination node is broader then the command cache from the source node, the query cache is re-executed on the parent node and the data matching the queries is sent to the destination node. Conversely, if the command cache in the source node is broader then the query cache from the source node, the command cache queries are executed on the parent node and the data matching the queries is fetched by the destination node.

If a source replica fails when a destination is replicating state from it, the session may have to wait for the source replica to be available again and continue the transfer for the rows that it had not already replicated. The application may be informed about any such issue through an exception notification. The application can then decide to wait and retry the operation or invalidate the session and restart.

Use Cases. The present disclosure provides a practical application of a system and method and advances the state of the technological art in edge computing, specifically in data replication which improves the performance of edge computing. There are several exemplary use cases which may utilize the system and method of the present disclosure. In the case of a mobile client, the client may take a video on the mobile device and upload the video to a local edge datastore. The user then edits the video while traveling and the entire session is preserved in the datastore.

In another example, an application's functionality may be partitioned and deployed on different datacenters. Session consistency is useful when the results of executing one function on one datacenter should be made visible to another function running on a different datacenter. As an example, consider the case of a simple access control service that consists of three functions: login, logout, and authorize. A client logs into the system by providing a password to validate against a hash stored in the datastore. The login function is deployed on the cloud datacenter to ensure that sensitive password information is not replicated anywhere else. After successful validation, login adds a certificate with the user's permissions to the datastore. Similarly, to log a user out, logout modifies the certificate to indicate that it is no longer valid. Subsequent client requests (e.g., read an email, send a message) execute on one of the edge datacenters after first running authorize, which involves reading the user's certificate from the datastore to verify its validity. By grouping the operations performed on behalf of a client into a single session, a datastore that provides session consistence would guarantee that the version of the certificate created by the most recent invocation to login or logout is the one that is read by authorize.

Yet another use case involves an application (or an application component) being reallocated between datacenters. Migration may be done for load balancing purposes, when the demands of a task surpasses the locally available resources on the current execution location, or to improve quality of experience. Session consistency is needed when after migration an application reads state from the datastore in the new datacenter that was either read or written in the old datacenter. As an example, consider the case of an interactive web hosted game that stores the state of the game in the datastore. When the network is experiencing low queuing delay, the application runs on the cloud, but migrates to a datacenter on the edge when an increase in wide-area traffic degrades the user's experience. By grouping the operations performed on behalf of each user into its own session, a datastore that provides session consistency guarantees that after migration the state of the game presented to the user corresponds to the user's last move.

It will be understood that the afore-mentioned use cases are exemplary only. There are many use cases for the system and method disclosed herein and the scope of the appended claims is intended to apply to various or multiple use cases unless otherwise specified in the claims themselves.

In performance testing, query-based tagging mechanism on average identifies 13.4 rows per query. The system and method of the disclosure further minimizes the data transfer by not transferring up-to-date data already existing on the destination. In our example application use case, this saving may be as much as 95%. Finally, the system and method take advantage of the hierarchical structure of edge storage and fetches data from a common parent when doing so results in lower transfer times. In an example application the data transfer time is reduced by as much as 84%

While examples of an edge computing system in which datastores can be managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

The invention claimed is:

1. A method comprising:
   determining an application has migrated from being hosted on a common parent node to being hosted on a destination node, wherein the common parent node migrated the application to the destination node in response to detecting a queuing delay associated with the application, wherein the queuing delay is being experienced by a client that is accessing the application from a current node and the current node determining that available computing resources of the current node is not sufficient to complete a task associated with the application resulting in a determination;
   creating by a server a session token, the session token being associated with a current session between a client and the current node, the session token including a session identifier for the current session and a current replica field, the current replica field identifying the current node, the current node comprising an edge node of an edge computing network, the current node storing a first data replica associated with the application, and the current node further executing queries associated with the session token;
   capturing in a cache at the current node associated with the current replica field of the session identifier, a set of queries from the client associated with the application;
   receiving, at the current node, a request from the client for data access at the destination node, the destination node storing a second data replica associated with the application, the destination node comprising another edge node of the edge computing network, wherein the current node and the destination node are hierarchal siblings sharing the common parent node, wherein the receiving the request comprises receiving from the client the session token that had been passed from the server to the client by a passing function comprising an HTTP cookie, the session token including the session identifier;
   responsive to the receiving the request from the client, transferring a first subset of data records associated with the application from the current node to the second data replica stored at the destination node, wherein the first subset of data records is selected based on the session identifier and the set of queries, wherein the transferring the first subset of data records is delayed if there is another transfer in process, wherein the session token includes a status indicator comprising a status of the another transfer, wherein the transferring the first subset of data records is executed when the status indicator identifies the another transfer as completed, and wherein a second subset of data records associated with the application from the current node that have been propagated to the common parent node are pulled by the destination node from the common parent node such that only the first subset of data records that have not been propagated to the common parent node are transferred from the current node to the destination node in response to the queuing delay and based on the determination, wherein a portion of the data records indicates a state of the application; and granting access to the client to the destination node, wherein the granting of the access to the destination node causes mitigation of the queuing delay and facilitates a completion of the task.

2. The method of claim 1, wherein the current node executes the queries in the cache to create updated data records prior to the transferring the second subset of data records.

3. The method of claim 2, wherein the second subset of data records comprises the updated data records.

4. The method of claim 2, further comprising sending the cache from the current node to the destination node.

5. The method of claim 1, wherein the destination node initiates the transferring the second subset of data records when accessed by the client.

6. The method of claim 5, wherein the destination node identifies the current node based on the session token received from the client.

7. A system comprising:
a client device configured to execute an application thereon and further configured to access one or more edge memory nodes in an edge computing network;
an input-output interface;
a processor coupled to the input-output interface, wherein the processor is further coupled to a plurality of memory nodes forming a hierarchal arrangement, the hierarchal arrangement including a parent node and two or more sibling nodes, wherein a subset of the memory nodes comprise the edge memory nodes, and wherein each of the memory nodes has stored thereon executable instructions that, when executed by the processor, cause the processor to effectuate operations comprising:
determining, by a current edge node, the application migrated from being hosted on a common parent node to being hosted on a destination edge node, wherein the common parent node migrated the application to the destination edge node in response to detecting a queuing delay associated with the application, wherein the queuing delay is being experienced by a client that is accessing the application from the current edge node and the current edge node determining that available computing resources of the current edge node is not sufficient to complete a task associated with the application resulting in a determination;
receiving a query, from the client device, at the current edge node of the edge computing network, wherein the current edge node and the destination edge node of the edge computing network are hierarchal siblings sharing the common parent node, wherein the query includes a session token, wherein the session token had been generated by a server, wherein the session token had been passed from the server to the client device by a passing function comprising an HTTP cookie, and wherein the current edge node stores a first data replica associated with the application;
processing the query by the current edge node, producing a processed query;
returning the processed query to the client device;
capturing the query in a cache at the current edge node;
receiving a transfer request at the current edge node from the destination edge node, the destination edge node storing a second data replica associated with the application, wherein the receiving the transfer request comprises receiving from the client device the session token, the session token including a session identifier;
executing the query at the current edge node to create an updated data set associated with the application, wherein the executing the query is responsive to the receiving the transfer request;
transferring a first subset of records of the cache associated with the application and the updated data set to the destination edge node to update the second data replica, wherein the first subset of the records of the cache are selected based on the session identifier, wherein the transferring the first subset of the records of the cache and the updated data set is responsive to the receiving the transfer request, wherein the transferring the first subset of records of the cache and the updated data set is delayed if the session token includes a status indicating that a transfer is in process, and wherein a second subset of records from the current edge node that have been propagated to the common parent node are pulled by the destination edge node from the common parent node such that only records that have not been propagated to the common parent node are transferred from the current edge node to the destination edge node in response to the queueing delay and based on the determination, wherein a portion of the first subset of records indicates a state of the application; and
granting access by the client to the destination edge node, wherein the granting of the access to the destination edge node causes mitigation of the queuing delay and facilitates a completion of the task.

8. The system of claim 7, wherein the query is a write request comprising a new data object from the client device, and wherein the operations further comprise pushing the new data object to the common parent node from the current edge node.

9. The system of claim 8, wherein the current edge node processes a plurality of queries by the client device, and wherein the transferring the second subset of records of the cache is effectuated by transferring only the updated data set to the destination edge node that does not include the new data object.

10. A method comprising:
hosting, at a destination node, an application as part of migrating the application from being hosted at a common parent node, wherein the common parent node migrated the application to the destination node in response to detecting a queueing delay associated with the application wherein the queueing delay is being experienced by a client that is accessing the application from a current node and the current node determining that available computing resources of the current node is not sufficient to complete a task associated with the application resulting in a determination;
receiving a query at the destination node from a client device, the destination node comprising an edge node of an edge computing network, wherein the query includes a session token having a session identifier and a current replica field identifying the current node which stores a first data replica associated with the application, and which executes queries associated with the session token, wherein the current node comprises an edge node of the edge computing network, wherein the current node and the destination node are hierarchal siblings sharing the common parent node, wherein the session token had been generated by a server, and wherein the session token had been passed from the server to the client device by a passing function comprising an HTTP cookie;

reading, at the destination node, the session token to determine the current node associated with the session identifier, the destination node storing a second data replica associated with the application;

requesting, by the destination node, a transfer of updated data records associated with the application forming a subset of all data records from the current node, wherein the subset of data records is selected based on the session identifier and a set of queries including the query;

receiving at the destination node the updated data records from the current node and a cache of previous queries executed by the current node to update the second data replica;

processing the query at the destination node;

receiving a request from another destination node to transfer further updated records associated with the application to the another destination node, wherein the request includes the session token further comprising a status field, and wherein transfer of the further updated records to the another destination node occurs only after the status field indicates that transfer to the destination node is complete, and wherein records from the current node that have been propagated to the common parent node are pulled by the destination node from the common parent node such that only records that have not been propagated to the common parent node are transferred from the current node to the destination node in response to the queueing delay and based on the determination, wherein a portion of the updated data records indicate a state of the application; and granting access by the client to the destination node, wherein the granting of the access to the destination node causes mitigation of the queuing delay and facilitates a completion of the task.

11. The method of claim 1, wherein the current node and the destination node are part of a mobile network.

12. The method of claim 11, wherein the client is a mobile device.

13. The system of claim 7, wherein the system is a part of a telecommunications system.

14. The system of claim 13, wherein the telecommunications system comprises a wireless telecommunications system.

15. The system of claim 13, wherein the telecommunications system comprises a wired telecommunications system.

16. The method of claim 10, wherein the destination node is part of a cellular communication system.

17. The method of claim 16, wherein the another destination node is part of the cellular communication system.

18. The system of claim 7, wherein the current edge node and the destination edge node are part of a mobile network.

19. The system of claim 7, wherein the client device is a mobile device.

20. The method of claim 10, wherein the client device is a mobile device.

* * * * *